(12) United States Patent
Deitz et al.

(10) Patent No.: US 6,578,158 B1
(45) Date of Patent: Jun. 10, 2003

(54) METHOD AND APPARATUS FOR PROVIDING A RAID CONTROLLER HAVING TRANSPARENT FAILOVER AND FAILBACK

(75) Inventors: William G. Deitz, Niwot, CO (US); Keith Short, LaFayette, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,523

(22) Filed: Oct. 28, 1999

(51) Int. Cl.$^7$ .............................................. G06F 11/00
(52) U.S. Cl. ............................................. 714/11; 714/5
(58) Field of Search ............................. 714/6, 7, 8, 11, 714/710, 5; 711/114

(56) References Cited

U.S. PATENT DOCUMENTS

| | | | |
|---|---|---|---|
| 5,237,658 A | | 8/1993 | Walker et al. ............... 395/200 |
| 5,274,645 A | * | 12/1993 | Idleman et al. ............. 371/10.1 |
| 5,367,669 A | | 11/1994 | Holland et al. ............. 395/575 |
| 5,553,230 A | * | 9/1996 | Petersen et al. ............. 395/180 |
| 5,757,642 A | | 5/1998 | Jones ......................... 364/134 |
| 5,790,775 A | * | 8/1998 | Marks et al. .......... 395/182.07 |
| 5,812,754 A | * | 9/1998 | Lui et al. ............... 395/182.04 |
| 5,922,077 A | | 7/1999 | Espy et al. ..................... 714/7 |
| 6,129,027 A1 | * | 2/2001 | El-Batal ..................... 370/222 |
| 6,219,753 B1 | * | 4/2001 | Richardson ................. 711/114 |
| 6,330,687 B1 | * | 12/2001 | Griffith ........................... 714/6 |

* cited by examiner

Primary Examiner—Robert Beausoliel
Assistant Examiner—Marc Duncan
(74) Attorney, Agent, or Firm—Dorsey & Whitney LLP

(57) ABSTRACT

A method and apparatus for controlling a memory system 100 comprising a plurality of controllers 105 connected by a fibre channel arbitrated loop 145 to provide transparent failover and failback mechanisms for failed controllers. The controllers 105 are adapted to transfer data between a data storage system 120 and at least one host computer 110 in response to instructions therefrom. In the method, a unique identifier is provided to each controller 105. The operation of the controllers 105 is then monitored and, when a failed controller is detected, a failover procedure is performed on a surviving controller. The failover procedure includes disabling the failed controller and instructing the surviving controller to assume the identity of the failed controller. Thus, the surviving controller is capable of responding to instructions addressed to it and instructions addressed to the failed controller, and the failure of the failed controller is transparent to the host computer 110. A computer program and a computer program product for implementing the method are also provided.

25 Claims, 4 Drawing Sheets

METHOD AND APPARATUS FOR PROVIDING A RAID CONTROLLER HAVING TRANSPARENT FAILOVER AND FAILBACK

FIELD OF THE INVENTION

This invention pertains generally to the field of computer memory systems, and more particularly to a method and apparatus for controlling redundant arrays of independent disks.

BACKGROUND OF THE INVENTION

Modern computers frequently require large, fault-tolerant memory systems. One approach to meeting this need is to provide a Redundant Array of Independent Disk drives (RAID) usually including a plurality of hard disk drives operated by a disk array controller that is coupled to a host computer. The controller provides the brains of the memory system, servicing all host requests, storing data to or retrieving it from the RAID, caching data to provide faster access, and handling drive failures without interrupting host requests. Given the importance of the controller, numerous solutions have been suggested minimize the potential for interrupted service due to controller malfunction. One such solution calls for providing dual-active controllers having failover and failback capabilities. Dual-active controllers are a pair of controllers that are connected to each other and to all the disk drives in a RAID. In normal operation, input/output (I/O) requests from the host computer are divided between the dual-active controllers to increase the rate at which information can be transferred to or from the RAID, commonly referred to as the bandwidth of the memory system. However, in the event that one of the controllers fails, the surviving controller takes over the functions of the failed controller and begins servicing host requests addressed to the failed controller in addition to those addressed to it. The mechanism that allows this is commonly known as a failover mechanism. If the surviving controller is able to assume the functions of the failed controller without any actions on the part of the host computer, for example redirecting I/O requests to the surviving controller, the failover mechanism is said to be transparent. If the failed controller can be subsequently replaced and normal operation resumed without de-energizing or reinitializing the controllers the memory system is said to have a failback mechanism.

One example of the use of such dual-active controllers is described, for example, in U.S. Pat. No. 5,790,775, to Marks et al. uses dual-active controllers connected to the host computer by a Small Computer System Interface (SCSI) bus. Typically, the controllers are also connected to a RAID comprising multiple disk drives through a number of additional SCSI buses. Each SCSI device on a bus, such as a controller or a disk drive, is assigned one bit as an identifier (SCSI ID) to permit the host computer to select a particular controller, and the controller to select a particular disk drive. Thus, the method permits a maximum of eight devices to be identified on a standard 8-bit SCSI bus. In addition, the controllers are connected to one another by a separate communications link, and each has access to a cache memory in the other. Although both controllers are connected to every disk drive in the RAID, to permit dual-active operation each disk drive is typically under primary control of one of the controllers. This is accomplished by dividing the RAID into groups of disk drives that appear to the host computer as a logical drive or unit identified by a logical unit number (LUN) and, during initialization, associating each LUN with the SCSI ID of a particular controller. In normal operation, a controller responds only to I/O requests which are addressed to it and which refer to LUNs over which it has primary control. However, if a controller fails the remaining controller of the pair obtains configuration information, including the SCSI ID and the LUNs of the failed controller, over the communications link and begins servicing requests addressed by the host to the failed controller as well as those addressed to itself.

While the above approach has been effective in reducing interruptions in service for memory systems having dual-active controllers, it is limited by the architecture of the SCSI bus. Traditionally, SCSI buses have from eight to sixteen signal lines which allows a maximum of from eight to sixteen SCSI devices to be interconnected by the SCSI bus at any one time. Thus, systems which use a 16-bit wide SCSI bus on the host side and 8-bit wide SCSI buses on the device side, typically provide for at most six device side SCSI buses having six disk drives each. Moreover, the above approach, which relies on SCSI IDs, has not been implemented using fibre interface type controllers.

Fibre interface type controllers are coupled to a host computer through one or more fibre channels. Fibre channel is the general name of a technology using an integrated set of standards developed by the American National Standards Institute (ANSI) for high speed, serial communication between computer devices. (See for example the ANSI standard X3T11, "Fibre Channel Physical and Signaling Interface (FC-PH)," Rev 4.3 (1994), hereby incorporated by reference.) Manufacturers of RAID systems have been moving to fibre channel technology because it allows transmitting of data between computer devices at rates of over 1 Gbps (one billion bits per second), and at distances exceeding several hundred meters and more. Also, fibre channel arbitrated loop (FC-AL) allows for 127 unique loop identifiers, one of which unique identities is reserved for a fabric loop port.

The widely accepted approach to providing failover/failback capability in RAID systems comprising fibre interface controllers has been to use dual-active controllers coupled by a redirecting driver. In the event of a controller failure the redirecting driver shifts host requests from the failed controller to a surviving controller. The failed controller can then be replaced and the memory system reinitialized to return to normal, dual-active controller operation. The redirecting driver can be implemented using a software or hardware protocol. One exemplary redirecting driver is disclosed in U.S. Pat. No. 5,237,658, to Walker et al., hereby incorporated by reference. However, one problem associated with this type of solution is that it is achieved at the expense of added memory system complexity that increases cost and decreases bandwidth. In addition, when, as is common, the redirecting driver is implemented using software in the host computer, this approach is not independent of the host computer, and typically requires a special driver for each host computer system on which it is to be utilized. This further adds to the cost and complexity, and increases the difficulty of installing and maintaining the memory system.

Accordingly, there is a need for a memory system comprising a number of fibre interface controllers and having a failover mechanism that is transparent to a host computer. There is a further need for such a memory system having a failback mechanism that is also transparent to the host computer. The present invention provides a solution to these and other problems, and offers additional advantages over the prior art.

SUMMARY OF THE INVENTION

The present invention provides a memory system and method of operating a memory system. In one embodiment, the memory system includes a number of controllers connected by a fibre channel arbitrated loop to provide transparent failover and failback for failed controllers. The controllers are adapted to transfer data between a data storage system and at least one host computer in response to instructions therefrom. In the inventive method, a unique identifier is provided to each controller to permit the host compute r to address instructions to a specific controller. Then, operation of the controllers is monitored and when a failed controller is detected, a failover procedure is performed on a surviving controller. In one embodiment, the failover procedure disables the failed controller and assumes the identity of the failed controller. Thus, the surviving controller becomes capable of responding to instructions addressed to it and instructions addressed to the failed controller, and the failure of the failed controller is transparent to the host computer. In one particular embodiment, the step of providing a unique identifier to each controller preferably includes the step of providing a world wide name to each controller, and more preferably the step further includes providing a loop identifier to each controller.

In another aspect the invention provides a memory system for transferring data between a data storage system and at least one host computer in response to instructions therefrom. The memory system includes a pair of dual-active controllers connected by a fibre channel arbitrated loop. Each controller has a unique identifier and is adapted to assume the identity of a failed controller and to respond to instructions addressed to it, thereby rendering failure of the failed controller transparent to the host computer. In one embodiment, the memory system further includes a communication path coupling the controllers, the communication path being adapted to enable each controller to detect failure of the other controller. The present invention is particularly useful for data storage systems comprising multiple disk drives coupled to the controllers by disk channels, in which at least one disk channel also serves as the communication path.

In yet another aspect the invention provides a computer program and a computer program product for operating a memory system comprising a plurality of controllers, each controller having a unique identifier, and the controllers adapted to transfer data between a data storage system and at least one host computer in response to instructions therefrom. The computer program product includes a computer readable medium with a computer program stored therein. The computer program has a failure detection unit adapted to detect a failed controller . A failover unit is adapted to enable a surviving controller to respond to instructions addressed to it and to instructions addressed to the failed controller. The failover unit includes a disabling unit adapted to disable the failed controller. The failover unit also includes a loop initialization unit, which is adapted to instruct a surviving controller to assume the identity of the failed controller and to instruct the surviving controller to respond to instructions addressed to it and to the failed controller as well as instructions addressed to the surviving controller. Thus, failure of the failed controller is transparent to the host computer. In one embodiment, each controller has an active port and a failover port, and the failover unit is adapted to activate the failover port of the surviving controller. In another embodiment, the computer program product further includes a replacement detection unit adapted to instruct a replacement controller to assume the identity of the failed controller and respond to instructions to the failed controller, thereby rendering replacement of the failed controller transparent to the host computer.

In still another aspect the invention provides a memory system for transferring data between a data storage system and at least one host computer in response to instructions and from. The memory system comprising a pair of dual-active controllers connected by a fibre channel arbitrated loop, each controller having a unique identifier, and a means for providing a failover mode from a failed controller to a surviving controller that is substantially transparent to the host computer. In one embodiment, the means for providing a failover mode is a computer program product having a computer program including a loop initialization unit adapted to instruct the surviving controller to assume the identity of the failed controller and to instruct the surviving controller to respond instructions addressed to it and to the failed controller.

BRIEF DESCRIPTION OF THE DRAWINGS

Additional objects and features of the invention will be more readily apparent from the following detailed description and appended claims when taken in conjunction with the drawings, in which:

DETAILED DESCRIPTION

The present invention is directed to a memory system having a number of controllers adapted to transfer data between at least one host computer and a data storage system, such as one or more Redundant Array of Independent Disks (RAID) storage systems. The controllers are coupled to the host computer and one another through a host-side loop to provide a failover and a failback mechanism for a failed controller that is transparent to the host computer. Advantageously, the controllers are connected by a fibre channel arbitrated loop (FC-AL). While the invention is described using examples of data storage system comprising a RAID having multiple magnetic disk drives, the present invention can be used with other data storage systems, as apparent to those skilled in the art, including arrays and individual disk drives in which the disk drives are optical, magnetic, or magneto-optical disk drives.

Figure 1:
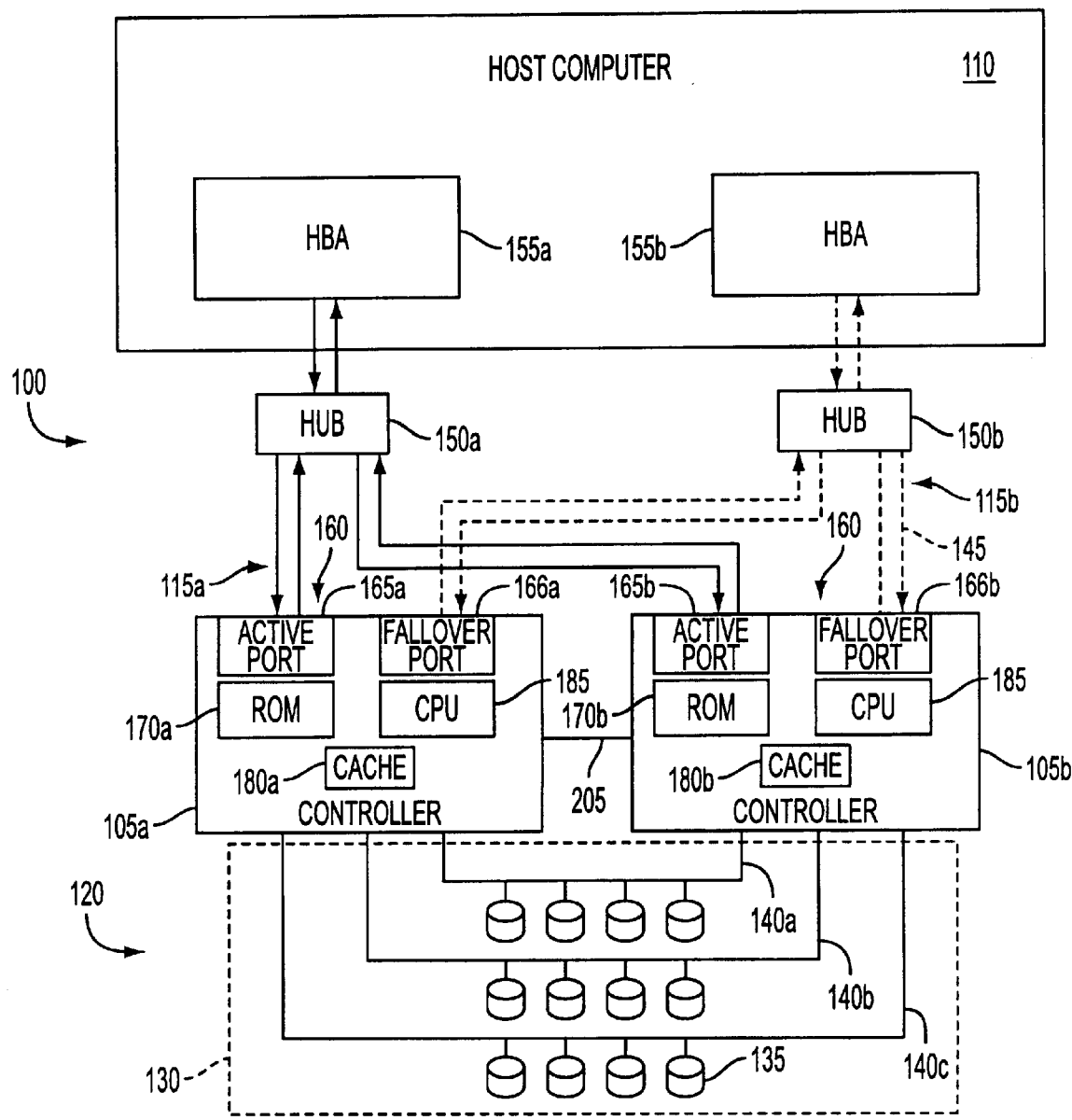
FIG. 1 is a block diagram of an embodiment of a memory system comprising a pair of controllers having a transparent failover and failback mechanism according to the present invention.

FIG. 1 shows a block diagram of an exemplary embodiment of a memory system 100 according to the present invention having a pair of controllers 105 (singularly 105a and 105b) coupled to a host computer 110 through a pair of host-side loops 15 (singularly 115a and 115b). It is to be understood that by host-side loop 115 it is meant a communication path which connects the controllers 105 to the host computer 110, and that the host-side loop can also connect other devices or systems (not shown) to the host computer. The controllers 105 are in turn coupled a data storage system 120, shown here as a RAID 130 comprising multiple disk drives 135, via several device-side loops 140 (singularly 140a to 140c) also known as disk channels. Alternatively, the controllers 105 could also be coupled to the data storage system 120 via SCSI buses (not shown). Although FIG. 1 shows a single pair of controllers 105 coupled by three device-side loops 140 to a RAID 130 comprising only twelve disk drives 135, the illustrated architecture is extendable to memory systems having any number of controllers, disk drives, and device-side loops. For example, the memory system 100 can a number, n, of n-way controllers using operational primitives in a message passing multi-controller non-uniform workload environment, as described in commonly assigned co-pending U.S. patent application Ser. No. 09/326,497, which is hereby incorporated by reference.

The host-side loops 115 are made up of several fibre channels 145 and a hub 150a, 150b. The term fibre channel as used here refers to any physical medium that can be used to transmit data at high speed, for example to serially transmit data at high speed in accordance with standards developed by the American National Standards Institute (ANSI), such as for example optical fibre, co-axial cable, or twisted pair telephone line. Each of the host-side loops 115 connect to three nodes or ports, including a single server port known as a host bus adapter HBA 155a, 155b, on the host computer 110 and to two controller ports 160a, 160b, on each of the controllers 105. The host-side loops 115 are adapted to enable data and input/output (I/O) requests from the host computer 110 to be transferred between any port on the loop 115.

The controllers 105 can be any suitable fibre channel compatible controller that can be modified to operate according to the present invention, such as for example the DAC960SF, commercially available from Mylex, Inc., Boulder, Colo. Such controllers 105 include, or can be modified to include, an active port 165a, 165b, and a failover port 166a, 166b, on each controller, and a register (not shown) adapted to support the failover and a failback mechanism of the present invention. A pair of the controllers 105 can be configured to operate as dual-active controllers as described above, or as dual-redundant controllers wherein one controller serves as an installed spare for the other, which in normal operation handles all I/O requests from the host computer 110. Preferably, the controllers 105 operate as dual-active controllers to increase the bandwidth of the memory system 100. Generally, each or the controllers 105 have a computer readable medium, such as a read only memory (ROM) 170, in which is embedded a computer or machine readable code, commonly known as firmware, with instructions for configuring and operating the controller, a cache 180a, 180b, for temporarily storing I/O requests and data from the host computer 110, and a local processor 185a, 185b, for executing the instructions and requests. The firmware of each controller is modified to support the failover and a failback mechanism of the present invention.

To enable the controllers 105 to be operated in dual-active mode, the controllers on host-side loops 115a, 115b, are identified by a unique identifier to permit the host computer 110 to address an I/O request to a specific controller. In one embodiment, the unique identifier includes a non-volatile, 64 bit World Wide Name (WWN). A WWN is an identifying code that is hardwired, embedded in the firmware, or otherwise encoded in a fibre channel compatible device, such as the HBA 155a, 155b, or the controllers 105, at the time of manufacture. Additionally, the unique identifier includes a loop identifier (LOOP ID) which is.assigned to each port in a host-side loop 115a, 115b, during a system initialization of the memory system 100. This LOOP ID can be acquired during a Loop Initialization Hard Address (LIHA) phase of the system initialization, or during a Loop Initialization Software Address (LISA) phase. Because not all host computers have operating systems that support addressing schemes using WWNs, for example some legacy host computer systems, in a preferred embodiment, the unique identifier includes both a WWN and a LOOP ID to enable the memory system 100 of the present invention to be used with any host computer 110 independent of the operating system. During system initialization, each of the controllers 105 register the unique identifier of the other controller. This enables a surviving controller, for example controller 105a, to accept and process I/O requests addressed to a failed controller, for example controller 105b, by assuming the identity of the failed controller.

The RAID is comprised of multiple virtual or logical volumes. Although the controllers 105 share the same RAID 130, that is both controllers are connected to every disk drive 135 in the RAID, preferably each logical volume is under the primary control of one of the controllers so that coherency need not be maintained between the caches 180a, 180b, of the controllers when they are operated in dual-active mode. By primary control it is meant that during normal operation each logical volume 135 in the RAID 130 is controlled solely by one of the controllers 105. Each logical volume is represented by a logical unit number (LUN) to the host computer 110. Each LUN in turn is associated with the unique identifier of one of the controllers 105 so that when data needs to be stored in or retrieved from a particular LUN, the I/O request is automatically directed to the correct controller.

Figure 2:
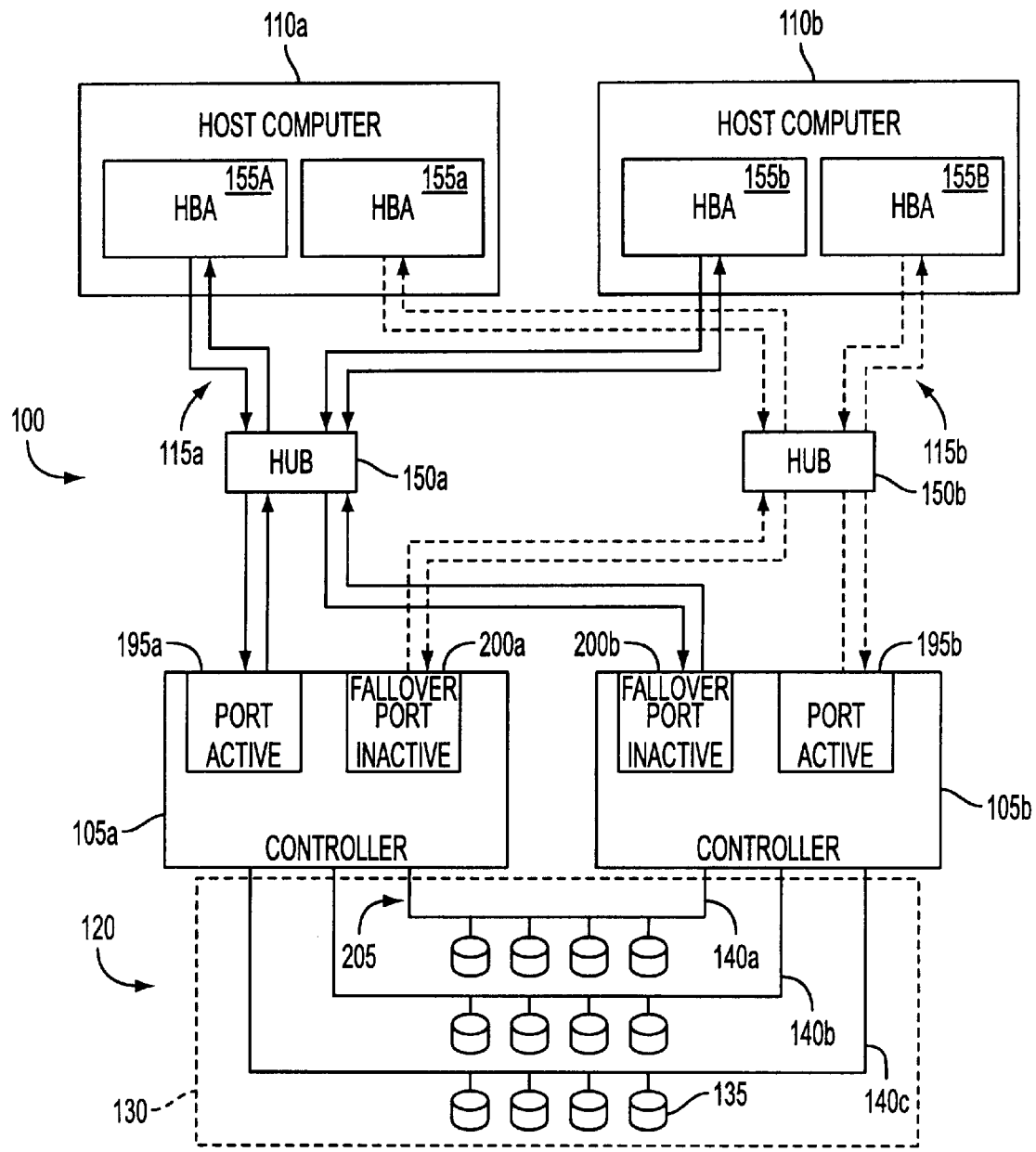
FIG. 2 is a block diagram of another embodiment of a memory system according to the present invention in an environment comprising a pair of host computer systems.

In a preferred embodiment, shown in FIG. 2, reliability is further enhanced by providing a clustered environment in which two host computers 110 (singularly 110a and 110b) each have direct access to both controllers 105 through a number of HBAs 155a–d. Thus, the failure of a single host computer 110a, 110b, will not result in the failure of an entire network of client computers (not shown). In addition, as shown in FIG. 2, each of the controllers 105 have at least one active port 195a, 195b and one inactive port 200a, 200b. The active ports 195a, 195b receive and process I/O requests sent by the host computers 110 on the host-side loops 115. The inactive ports 200a, 200b, also known as a failover ports, can process I/0 requests only when the active port 195a, 195b on the same host-side loop 115a, 115b, has failed. For example, in case of failure of controller 105a, inactive port 200b on surviving controller 105b assumes the identity of the active port 195a on failed controller 105a and begins accepting and processing I/O requests directed to the failed controller 105a.

In accordance with the present invention, the memory system further includes a communication path 205 adapted to transmit a signal from one controller 105 to another in the event of a controller failure. The communication path 205 can be a Small Computer System Interface (SCSI) bus or a fibre channel as described above. It can take the form of a dedicated high speed path extending directly between the controllers 105, as shown in FIG. 1, or one of the device-side channels 140a–c (disk channels) which can also serve as the communication path 205, as shown in FIG. 2. The signal passed between the controllers 105 to indicate controller failure can be a passive signal, such as for example the lack of a proper response to a polling or pinging scheme in which each controller interrogates the other at regular, frequent intervals to ensure the other controller is operating correctly. Alternatively, the signal can be a dynamic signal transmitted directly from a failed or failing controller 105a, 105b, to the surviving controller 105b, 105a, instructing it to initiate a failover process or mechanism. Optionally, the communication path 205 is also adapted to enable the controllers 105 to achieve cache coherency in case of controller failure.

Figure 3:
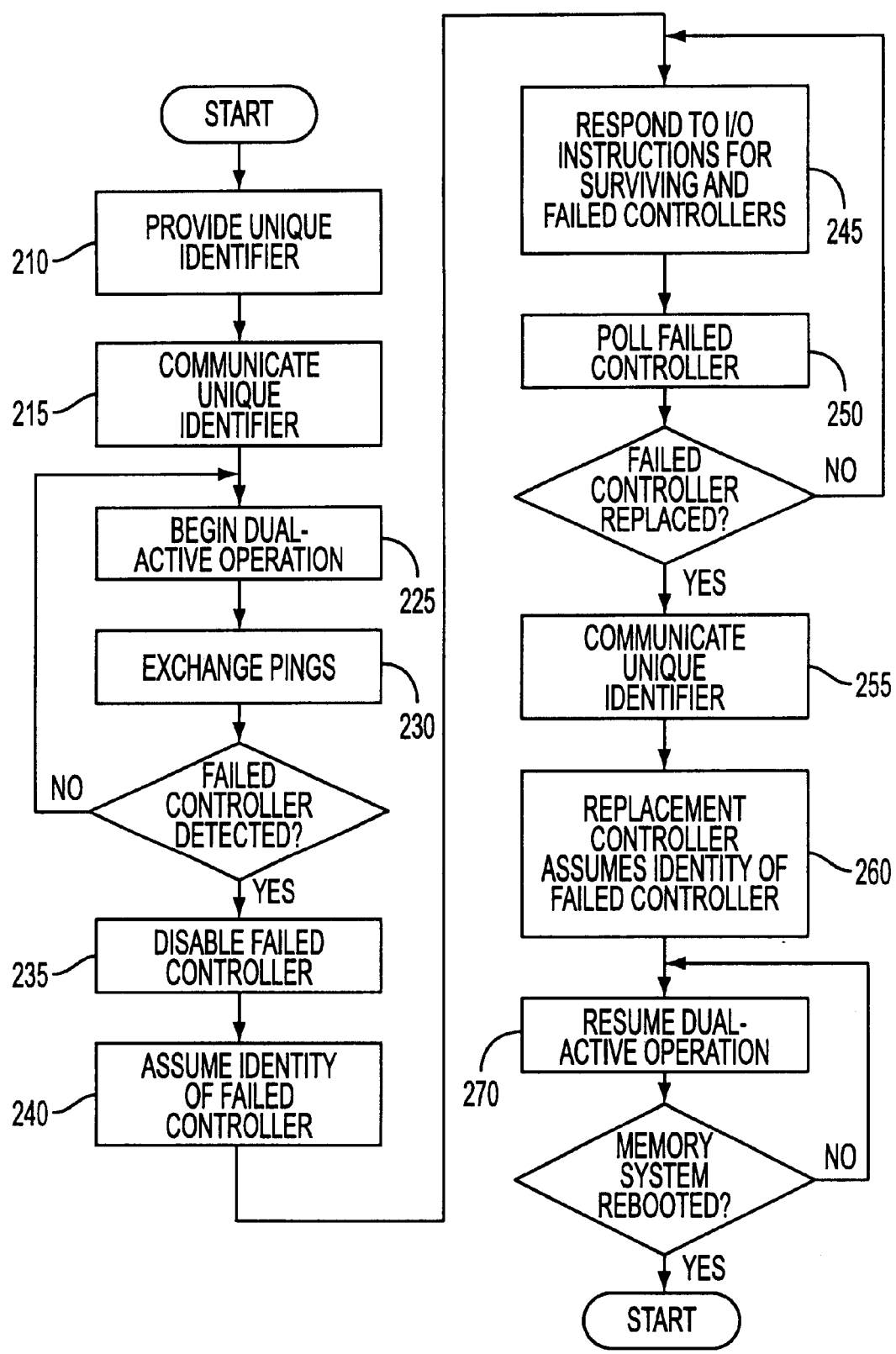
FIG. 3 is a flowchart showing an embodiment of a method of operating the memory system shown in FIG. 1 or FIG. 2 to provide a transparent failover and failback mechanism according to the present invention.

An exemplary method of operating the memory system 100 shown in FIG. 2 to provide a failover process that is substantially transparent to the host computers 110a, 11b, will now be described with reference to FIG. 3. The following initial actions or steps are required to make the failover operation transparent to the host computer. First, in a system initialization step 210 each of the controllers 105 is provided with a unique identifier which is communicated to the host computers 110. This step 210 generally merely involves querying the controllers 105 to obtain their WWN, but it may also include assigning a LOOP ID to each controller in a LIHA phase or a LISA phase, as described above. The unique identifiers are then registered by the host computers 110 and one or more of the LUNs are associated with each unique identifier. Next, in a communication step 215, the unique identifiers and their associated LUNs are communicated between the controllers 105 via the communication path 205. Each of the controllers 105 assign the unique identifier and the associated LUNs of the other controller, to its failover port 200a, 200b. This enables a surviving controller 105a, 105b to assume the identity of a failed controller 105b, 105a, and to accept and process I/O requests addressed to it by activating the normally inactive or failover port 200a, 200b.

The memory system 100 is then ready to begin regular operations in a dual-active operation step 225 in which the controllers 105 both simultaneously receive and process I/O requests from the host computers 110. During normal operations a fault detection step 230 is executed in which the controllers 105 exchange a series of "pings," also referred to as a heart beat signal, the response to which, as described above, signals to each controller that the other has not failed. This step 230 may also involve a scheme in which a failed or failing controller 105a, 105b dynamically signals a surviving controller 105b, 105a, that a failure has occurred or is about to occur.

On detection of a controller failure, a failover procedure is performed on the surviving controller 105a, 105b, the failover procedure involves the steps of disabling the failed controller (step 235) and assuming the identity of the failed controller (step 240). In the disabling step 235, the surviving controller 105a, 105b asserts a reset signal, which disables the failed controller 105b, 105a by resetting its local processor 185a, 185b, and the active port 195a, 195b, fibre protocol chip (not shown). Resetting the fibre protocol chip causes the hub 150a, 150b to automatically bypass the primary port 195a, 195b, on the failed controller 105a, 105b. In the assuming identity step 240, the failover port 200a, 200b of the surviving controller 105a, 105b, begins accepting and processing I/O requests addressed by the host computers 110a, 110b, to the failed controller 105b, 105a. Preferably, to speed up the failover process the unique identifier for the failed controller 105a, 105b, was previously assigned to the failover port 200a, 200b, during the communication step 215, and the surviving controller 105 merely activates the failover port 200a, 200b, to enable it to begin accepting and processing I/O requests.

After the failover process is completed, the surviving controller 105a, 105b, in a resume operation (step 245) resumes operations by responding to I/O requests addressed to itself and to the failed controller. The surviving controller 105a, 105b, responds to requests to store or retrieve data addressed to the failed controller, without any additional support from the host computers 110 or the HBAs 155. Because there is no need to alter the registered unique identifiers or the associated LUNs, the failover process is transparent to the host computers 110. To the host computers 110, the delay, if any, caused by the time it takes to detect the failed controller 105a, 105b and to perform the loop initialization procedure appears to be no more than a momentary loss of power to the memory system 100, which requires the host computers to re-transmit the last several commands sent to the failed controller.

Optionally, when the controllers 105 include caches 180a, 180b, the failover process can also include a cache flush step (not shown) and a conservative cache mode enable step (not shown). The cache flush step prevents the loss of data that was presented with good status to the host computers 110 because the data has been written to both caches 180a, 180b, but has not actually been written to the data storage system 120 before the controller failure. The cache flush step commits this data to the data storage system 120. Enabling conservative cache mode minimizes the chance of data being lost while operating with a single controller 105a, 105b, in failover mode, by ensuring that all data is written to the data storage system 120 prior to a good status signal being sent.

In another aspect, the present invention is directed to a memory system 100 having a failover mechanism, such as the one described above, that further includes a failback process or mechanism that is substantially transparent to the host computers 110a, 110b. To be transparent to the host computers 110a, 110b, the failback mechanism should support a hot swap of a failed controller 105a, 105b. By hot swap it is meant the failed controller 105a, 105b is removed and a replacement controller (not shown) put in service without de-energizing or re-booting the memory system 100 and/or the host computers 110a, 110b. An exemplary method of operating the memory system 100 shown in FIG. 2 to provide a failback mechanism will now be described with reference to FIG. 3.

In an initial step (not shown), a technician, such as a systems administrator, physically disconnects the failed controller 105a, 105b from the host-side loop 115a, 115b, and installs a replacement controller in its place. The surviving controller 105a, 105b, which began responding to I/O requests addressed to the failed controller in a resume operation step 245, detects the replacement controller in a replacement detection step 250. As with the fault detection step 230 described above, the detection of the replacement controller can be accomplished by a signal from the replacement controller to the surviving controller 105a, 105b, sent in response to a ping signal from the surviving controller. Alternatively, the replacement controller can include within its firmware instructions which cause it to find a surviving controller 105a, 105b, operating in failover mode and to directly send a signal to the surviving controller instructing it to initiate the failback procedure.

Once the replacement controller is detected, a failback procedure is performed. The replacement controller acquires the unique identifier and the associated LUNs of the failed controller from the surviving controller in a communication step 255 and assumes the identity of the failed controller in step 260. Optionally, in the communication step 255 the replacement controller also registers the unique identifier and LUNs of the surviving controller to enable it to assume the identity of the surviving controller 105a, 105b, should it fail in the future. Once the failback procedure has been completed, the surviving controller 105a, 105b, suspends operation of the failover port 200a, 200b on the controller and then asserts a reset signal (RESET) to the failover port in a reset step 305. The hub 150 coupled to the failover port detects the loss of signal for the failover port and bypasses it, switching the port back to inactive operation. In a resume step 270, the surviving controller 105a, 105b, then sends a resume message (RESUME) to the replacement controller, causing it to activate its primary port, thereby restoring the controllers 105 to dual-active operation. If conservative cache mode was enabled during the failover process, the surviving controller also discontinues conservative cache mode in this step 270.

The memory system 100 can continue operating in failback mode; that is, with the replacement controller assuming the identity of the failed controller and impersonating the previous failed controller 105a, 105b, indefinitely. However, when the memory system 100 is re-booted, the replacement controller is provided with a unique identifier, which is then communicated to the host computers and the other controller in the system initialization step 210, as described above. Generally, this involves querying the replacement controller to obtain its WWN.

Figure 4:
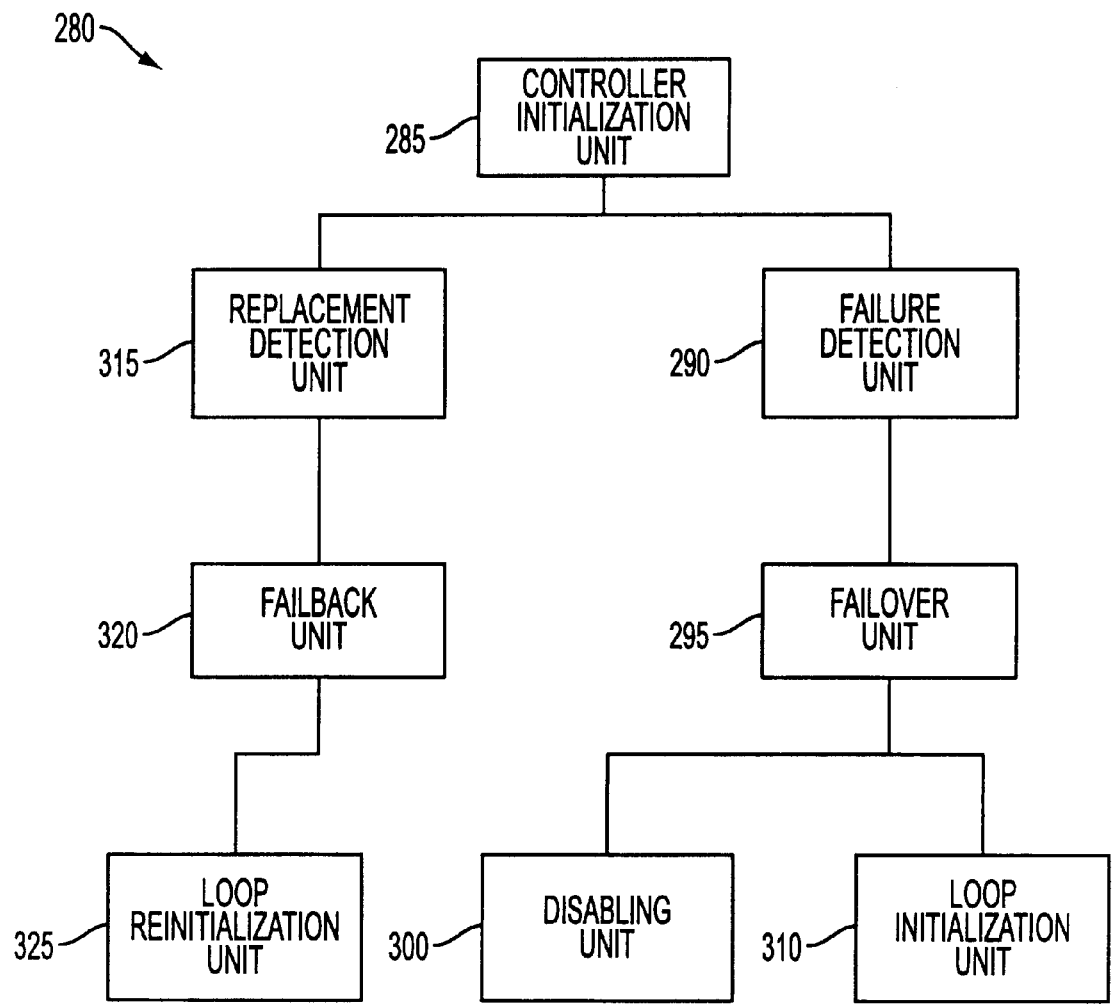
FIG. 4 is a block diagram illustrating the hierarchical structure of an embodiment of a computer program according to an embodiment of the present invention.

The failover and failback mechanisms of the present invention can be implemented using a computer program product, that includes a computer program 280 which is part of the firmware embedded in the ROM 170 of the controllers 105 and which is executed by the local processors 185. FIG. 4 is an illustrative block diagram of the hierarchical structure of the computer program 280 according to an embodiment of the present invention. The computer program 280 includes a controller initialization unit 285 adapted to provide the host computer 110 with the unique identifier of each of the controllers 105 on booting or re-booting. Generally, the unique identifier includes the WWN. The controller initialization unit 285 also includes program code instructing each of the controllers 105 to transmit and receive the unique identifier of the other controller.

The computer program 280 includes a failure detection unit 290 adapted to detect a failed controller, and a failover unit 295 adapted to enable a surviving controller to respond to instructions addressed to it and to instructions addressed to the failed controller. The failure detection unit 290 has program code for the polling scheme described above, including responding to the pings, to detect the failure of one of the controllers 105 during normal dual-active operation. The failover unit 295 has a disabling unit 300 adapted to disable the failed controller, and a loop initialization 310 adapted to instruct a surviving controller to assume the identity of the failed controller and to respond to instructions addressed to it and to the failed controller.

In a preferred embodiment, the computer program also includes a replacement detection unit 315 adapted to enable a failed controller to be replaced in a way that is substantially transparent to the host computer 110. The replacement detection unit 315 detects replacement of the failed controller by a technician. The replacement detection unit 315 has failback unit 320 and a loop re-initialization unit 325 for instructing a replacement controller to assume the identity of a failed controller and to respond to instructions addressed to it. The failback unit 320 generally includes program code similar to that of the failure detection unit 290. In one configuration (not shown), the failure detection unit 290 also serves as the failback unit 320. Alternatively, the failback unit 320 can include program code for accepting a signal from the technician that the failed controller has been replaced. The loop re-initialization unit 325 includes program code instructing the replacement controller to receive the unique identifier of the failed controller from the surviving controller and to assume the identity of the failed controller. The loop re-initialization unit 325 enables the replacement controller to begin accepting I/O requests addressed to the failed controller. Optionally, the loop re-initialization unit 325 may also include program code instructing the replacement controller to register the unique identifier of the surviving controller to enable it to assume the identity of the surviving controller should it fail in the future.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts, within the principles of the present invention to the full extent indicated by the broad general meaning of the terms in which the appended claims are expressed. For example, although the preferred embodiment described herein is directed to a memory system having dual-active controllers, the controllers could also be operated in a dual-redundant configuration in which one controller acts as an installed spare. Also, although the preferred embodiment described herein is directed to controllers for controlling a RAID, it will be appreciated by those skilled in the art that the teachings of the present invention can be applied to other computer devices utilizing fibre channel connections, including host bus adapters, tape library and bridge controllers without departing from the scope and spirit of the present invention.

We claim:

1. A method for operating a plurality of controllers adapted to transfer data between a data storage system and at least one host computer in response to instruction therefrom, the method comprising the steps of:
   (a) associating a unique identifier with each controller;
   (b) addressing instructions from the host computer to one of said plurality of controllers via a host-side loop using the unique identifier associated with the controller;
   (c) detecting a failed controller from among said plurality of connected controllers; and in response,
   (d) disabling the failed controller, and
   (e) a surviving controller, different from said failed controller, responding to instructions addressed to the surviving computer and to instructions addressed to the failed controller via the host-side loop, so that failure of.the failed controller is substantially transparent to the host computer; and
   wherein the step of associating a unique identifier with each controller comprises the step of associating a world wide name with each controller.

2. A method according to claim 1, wherein the host-side loop is a fibre channel arbitrated loop, and wherein the step of addressing instructions to one of said plurality of controllers comprises the step of addressing instructions to one of said plurality of controllers via the fibre channel arbitrated loop.

3. A method according to claim 1, wherein the step of associating a unique identifier with each controller further comprises the step of associating a loop identifier with each controller.

4. A method for operating a plurality of controllers adapted to transfer data between a data storage system and at least one host computer in response to instructions therefrom, the method comprising the steps of:
  (a) associating a different identifier with each controller;
  (b) addressing instructions from the host computer to one of said plurality of controllers via a host-side loop using the identifier associated with the controller;
  (c) detecting a failed controller from among said plurality of connected controllers; and in response,
    (d) disabling the failed controller, and
    (e) a surviving controller, different from said failed controller, responding to instructions addressed to the surviving computer and to instructions addressed to the failed controller via the host-side loop, so that failure of the failed controller is substantially transparent to the host computer; and
  wherein the plurality of controllers comprise a pair of controllers, and wherein the method further comprises the step of communicating the unique identifier of each controller to the other before step (c).

5. A method for operating a plurality of controllers adapted to transfer data between a data storage system and at least one host computer in response to instructions therefrom, the method comprising the steps of:
  (a) associating a different identifier with each controller;
  (b) addressing instructions from the host computer to one of said plurality of controllers via a host-side loop using the identifier associated with the controller;
  (c) detecting a failed controller from among said plurality of connected controllers; and in response,
    (d) disabling the failed controller, and
    (e) a surviving controller, different from said failed controller, responding to instructions addressed to the surviving computer and to instructions addressed to the failed controller via the host-side loop, so that failure of the failed controller is substantially transparent to the host computer; and
  wherein each controller has an active port and a failover port coupled to the host computer, and wherein step (e) comprises the step of activating the failover port of the surviving controller.

6. A method for operating a memory system having a plurality of controllers adapted to transfer data between a data storage system and at least one host computer in response to instructions therefrom, the method comprising the steps of:
  (a) associating a different identifier with each controller;
  (b) addressing instructions from the host computer to one of said plurality of controllers via a host-side loop using the identifier associated with the controller;
  (c) detecting a failed controller from among said plurality of connected controllers; and in response,
    (d) disabling the failed controller, and
    (e) a surviving controller, different from said failed controller, responding to instructions addressed to the surviving computer and to instructions addressed to the failed controller via the host-side loop, so that failure of the failed controller is substantially transparent to the host computer; and
  replacing the failed controller with a new controller substantially without re-booting the memory system; and
  wherein the new controller assumes the identity of the failed controller and responds to instructions addressed to it until the memory system is re-booted.

7. A memory system for transferring data between a data storage system and at least one host computer in response to instructions therefrom, the memory system comprising a pair of dual-active controllers connected by a host-side loop, wherein each controller has a unique identifier and is adapted to assume the identity of a failed controller and to respond to instructions addressed to it and instructions addressed to the failed controller, so that failure of the failed controller is substantially transparent to the host computer; and wherein the unique identifier comprises a world wide name.

8. A memory system according to claim 7, wherein the host-side loop comprises a fibre channel arbitrated loop.

9. A memory system for transferring data between a data storage system and at least one host computer in response to instructions therefrom, the memory system comprising a pair of dual-active controllers connected by a host-side loop, wherein each controller has a unique identifier and is adapted to assume the identity of a failed controller and to respond to instructions addressed to it and instructions addressed to the failed controller, so that failure of the failed controller is substantially transparent to the host computer; and wherein the unique identifier comprises a loop identifier to each controller.

10. A memory system for transferring data between a data storage system and at least one host computer in response to instructions therefrom, the memory system comprising a pair of dual-active controllers connected by a host-side loop, wherein each controller has a unique identifier and is adapted to assume the identity of a failed controller and to respond to instructions addressed to it and instructions addressed to the failed controller, so that failure of the failed controller is substantially transparent to the host computer; and wherein each controller comprises a computer readable medium and wherein the unique identifier comprises a machine readable code stored therein.

11. A memory system according to claim 10, further comprising a communication path coupling the controllers, the communication adapted to enable each controller to detect failure of the other controller.

12. A memory system according to claim 11, wherein the controllers are adapted to detect failure by transmitting and receiving pings.

13. A memory system for transferring data between a data storage system and at least one host computer in response to instructions therefrom, the memory system comprising a pair of dual-active controllers connected by a host-side loop, wherein each controller has a unique identifier and is adapted to assume the identity of a failed controller and to respond to instructions addressed to it and instructions addressed to the failed controller, so that failure of the failed controller is substantially transparent to the host computer; and wherein the data storage system comprises a plurality of disk drives coupled to the controllers by disk channels, and wherein the disk channels serve as the communication path.

14. A memory system for transferring data between a data storage system and at least one host computer in response to instructions therefrom, the memory system comprising a pair of dual-active controllers connected by a host-side loop, wherein each controller has a unique identifier and is adapted to assume the identity of a failed controller and to respond to instructions addressed to it and instructions addressed to the failed controller, so that failure of the failed controller is substantially transparent to the host computer; and wherein each controller has an active port and a failover port coupled to the host computer, and wherein each controller is adapted to activate the failover port upon failure of the other controller.

15. A method for operating each of a plurality of storage controllers coupled to a computer via a host-side loop, each of said storage controllers having a different identifier including a world wide name, said computer issuing I/0 instructions to each of said storage controllers, each of said I/O instructions including an I/O command and one of said identifiers to identify the storage controller to execute the respective I/O command, said method performed by each of said storage controllers comprising the steps of:

detecting that another of said storage controllers has failed, and in response, sending a disabling command to the failed storage controller, and handling I/O instructions which include the identifier, including the world wide name, of said failed storage controller and handling I/0 instructions which include the identifier, including the world wide name, of said each storage controller, such that the failure of said failed storage controller is transparent to said computer.

16. A method as set forth in claim 15 wherein each of said identifiers also includes a loop identifier.

17. A method as set forth in claim 15 wherein said plurality of storage controllers are coupled to a same storage device.

18. A method as set forth in claim 15 wherein said host-side loop is a Fibre Channel Arbitrated Loop and said I/0 instructions comply with Fibre Channel Arbitrated Loop architecture.

19. A method as set forth in claim 15 wherein each of said storage controllers communicates its identifier to the other storage controller(s) before detecting that the other storage controller(s) has/have failed.

20. A method as set forth in claim 15 wherein each of said storage controllers has an active port and a failover port coupled to said computer, and the handling step includes the step of activating the failover port to receive instructions which include the identifier of the failed storage controller.

21. A computer program product for operating each of a plurality of storage controllers having an active port and a failover port coupled to a computer via a host-side loop, each of said storage controllers having a different identifier, said computer issuing I/O instructions to each of said storage controllers, each of said I/O instructions including an I/O command and an identifier to identify a storage controller to execute the respective I/O command, said computer program product comprising:

a computer readable medium; and first program instructions to detect that another of said storage controllers has failed, and in response, second program instructions sending a disabling command to the failed storage controller, and third program instructions handling, via said failover port, I/0 instructions which include the identifier of said failed storage controller and handling, via said active port, I/O instructions which include the identifier of said each storage controller, such that the failure of said failed storage controller is transparent to said computer; and wherein said first, second and third program instructions are stored on said computer readable medium.

22. A computer program product as set forth in claim 21 wherein said computer readable medium is a semiconductor memory.

23. A computer program product as set forth in claim 22 wherein each of said identifiers comprises a world wide name.

24. A computer program product as set forth in claim 23 wherein each of said identifiers also comprises a loop identifier.

25. A computer program product as set forth in claim 22 further comprising fourth program instructions, recorded on said medium, to communicate the identifier of said each storage controller to another of said storage controllers before said other storage controller fails.

* * * * *